United States Patent
Amoudi et al.

(10) Patent No.: US 11,867,394 B2
(45) Date of Patent: Jan. 9, 2024

(54) FLARE SPILL CONTROL SYSTEM

(71) Applicant: Saudi Arabian Oil Company, Dhahran (SA)

(72) Inventors: Ahmad A. Amoudi, Al Madinah (SA); Mohammed M. Otaibi, Dammam (SA); Hasan A. AlMugabgab, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 10 days.

(21) Appl. No.: 17/066,169

(22) Filed: Oct. 8, 2020

(65) Prior Publication Data

US 2022/0113026 A1    Apr. 14, 2022

(51) Int. Cl.
| | | |
|---|---|---|
| *E21B 41/00* | (2006.01) | |
| *F23G 7/08* | (2006.01) | |
| *B01D 19/00* | (2006.01) | |
| *B01D 45/08* | (2006.01) | |

(52) U.S. Cl.
CPC ........... *F23G 7/08* (2013.01); *B01D 19/0042* (2013.01); *B01D 45/08* (2013.01); *E21B 41/0071* (2013.01)

(58) Field of Classification Search
CPC ......... B05B 1/28; B65D 47/40; F16N 31/004; F16N 31/006; F23G 2209/10; F23G 2209/102; F23G 2900/54401; F23G 2207/10; F23G 2207/1015; F23G 2207/101; B01D 45/08; B01D 19/0042; E21B 43/34; E21B 43/40; E21B 41/0071; F23D 11/30
USPC .......... 431/202, 117, 118; 96/204, 189, 239, 96/220, 262
See application file for complete search history.

(56) References Cited

U.S. PATENT DOCUMENTS

| | | | | |
|---|---|---|---|---|
| 1,568,830 | A | * | 1/1926 | Gunderson ........... F16N 31/006 184/1.5 |
| 5,380,195 | A | * | 1/1995 | Reid ....................... F23G 7/085 431/202 |
| 5,788,477 | A | | 8/1998 | Jones |
| 5,810,578 | A | | 9/1998 | Hystad et al. |
| 5,919,036 | A | * | 7/1999 | O'Brien ..................... F23G 7/08 431/2 |
| 5,987,385 | A | | 11/1999 | Varsamis et al. |

(Continued)

FOREIGN PATENT DOCUMENTS

| | | | | |
|---|---|---|---|---|
| CA | 2985258 | | 5/2018 | |
| KR | 20170050280 | A * | 10/2015 | ............. B63B 35/44 |
| KR | 20170050280 | | 5/2017 | |

OTHER PUBLICATIONS

PCT International Search Report and Written Opinion in International Appln. No. PCT/US2021/053704, dated Dec. 23, 2021, 14 pages.

*Primary Examiner* — Avinash A Savani
(74) *Attorney, Agent, or Firm* — Fish & Richardson P.C.

(57) ABSTRACT

A hydrocarbon management system comprises a flare boom configured to connect to a drilling or production rig. The flare boom is configured to combust at least a portion of hydrocarbon fluids flowed from the rig to the flare boom. A catcher is configured to be spatially positioned relative to the end of the flare boom. The catcher comprises a diverter positioned to divert a flow of uncombusted hydrocarbon liquids from the flare boom, and a container configured to receive the uncombusted hydrocarbon liquids diverted by the diverter.

14 Claims, 6 Drawing Sheets

(56) References Cited

U.S. PATENT DOCUMENTS

| | | | |
|---|---|---|---|
| 5,997,284 A * | 12/1999 | Gustafson | B01D 19/0042 431/202 |
| 7,013,992 B2 | 3/2006 | Tessari et al. | |
| 7,044,999 B2 * | 5/2006 | Bankstahl | B23K 7/10 55/447 |
| 7,540,896 B2 * | 6/2009 | Noga | F24F 3/14 55/394 |
| 7,823,663 B2 | 11/2010 | Eddison | |
| 8,784,538 B2 * | 7/2014 | Malm | B01D 19/0042 96/198 |
| 8,936,009 B2 | 1/2015 | Hu | |
| 9,611,697 B2 | 4/2017 | Radford et al. | |
| 10,113,408 B2 | 10/2018 | Pobedinski et al. | |
| 10,302,083 B2 | 5/2019 | Downton | |
| 2003/0106694 A1 | 6/2003 | Wiseman | |
| 2010/0291492 A1 | 11/2010 | Poe et al. | |
| 2011/0085030 A1 * | 4/2011 | Poe | F23G 7/085 382/103 |
| 2012/0048619 A1 | 3/2012 | Seutter et al. | |
| 2013/0207301 A1 | 8/2013 | Guidry et al. | |
| 2015/0260397 A1 * | 9/2015 | Talasila | F23N 5/18 431/14 |
| 2018/0171774 A1 | 6/2018 | Ringer et al. | |
| 2019/0301244 A1 | 10/2019 | Moore et al. | |
| 2019/0368295 A1 | 12/2019 | Machocki et al. | |
| 2021/0003280 A1 * | 1/2021 | Umair | E21B 41/0071 |

\* cited by examiner

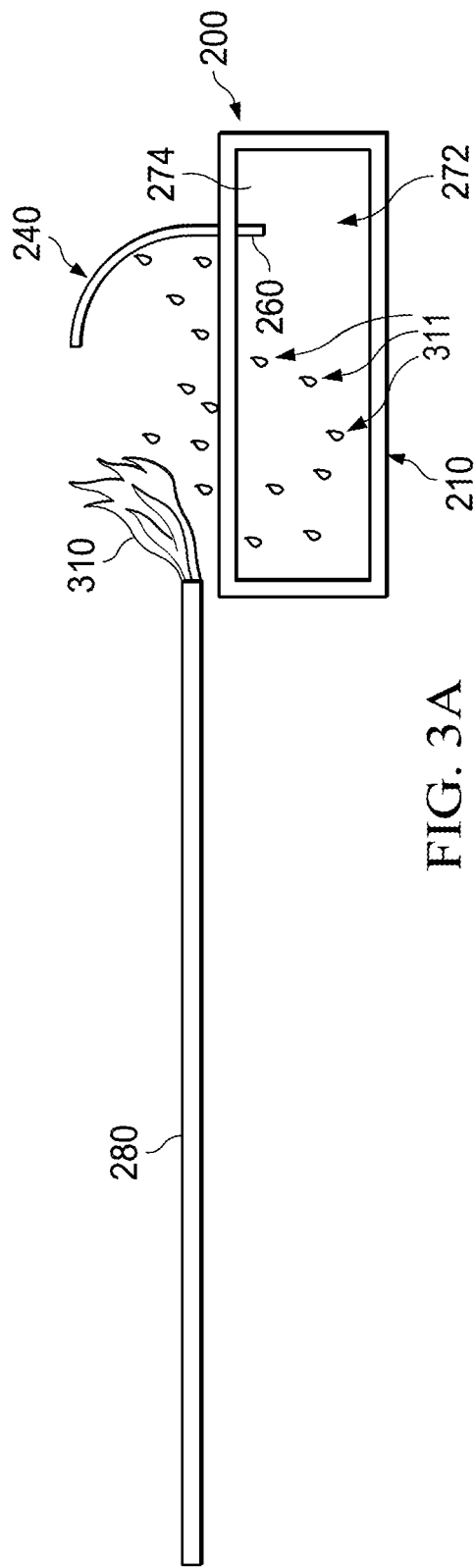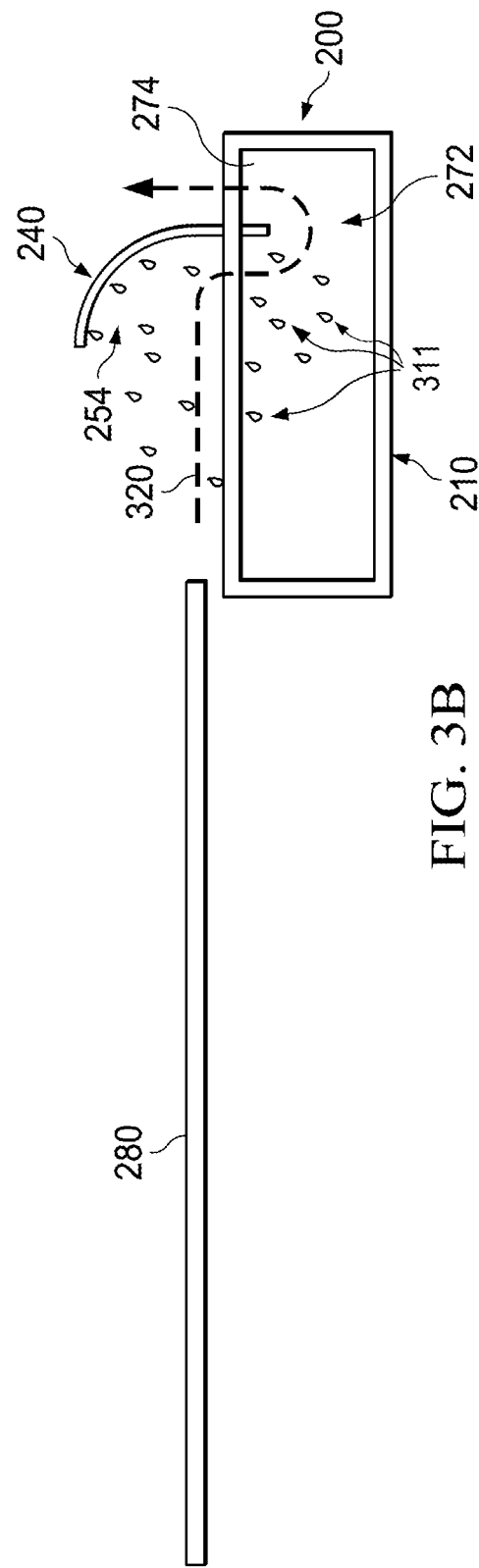

FLARE SPILL CONTROL SYSTEM

TECHNICAL FIELD

This disclosure relates to spill control as it relates to flaring of petroleum products from a flare boom.

BACKGROUND

A flare boom is a device that extends from an oil or gas rig that permits the burning of gas, either as a way to dispose of the gas or as a safety measure to relieve pressure during planned or unplanned over-pressuring of equipment. The boom extends the flare away from the main platform or rig, thus keeping the burning flame a safe distance from people and equipment.

SUMMARY

This disclosure describes technologies relating to spill protection as it relates to gas flaring, and in particular, to gas flaring from an oil or gas drilling or production rig.

Certain aspects of the subject matter described herein can be implemented as a hydrocarbon management system that includes a flare boom configured to connect to a drilling or production rig. The flare boom is configured to combust at least a portion of hydrocarbon fluids flowed from the rig to the flare boom. A catcher is configured to be spatially positioned relative to the end of the flare boom. The catcher includes a diverter positioned to divert a flow of uncombusted hydrocarbon liquids from the flare boom, and a container configured to receive the uncombusted hydrocarbon liquids diverted by the diverter.

An aspect combinable with any of the other aspects can include the following features. The container is sized to hold an expected volume of uncombusted hydrocarbon liquids flowing from the boom in a time period between an extinguishment of combustion and a response action initiated in response to a detection of the extinguishment by the sensor. The response action can be a shutdown of the flow or a re-ignition of the combustion.

An aspect combinable with any of the other aspects can include the following features. The diverter includes a back portion that is arcuate in shape.

An aspect combinable with any of the other aspects can include the following features. The diverter includes diverter side walls that are substantially planar and substantially vertical.

An aspect combinable with any of the other aspects can include the following features. The container includes container side walls that are substantially planar and substantially vertical. The container side walls are coplanar with the diverter side walls.

An aspect combinable with any of the other aspects can include the following features. The diverter is positioned above the container.

An aspect combinable with any of the other aspects can include the following features. The container is partially covered by a container top cover.

An aspect combinable with any of the other aspects can include the following features. The hydrocarbon management system can include a programmable logic computer in communication with the sensor.

Certain aspects of the subject matter described herein can be implemented as a catcher configured to be attached to the end of a flare boom. The catcher includes a diverter positioned to divert a flow of uncombusted hydrocarbon liquids from the flare boom, and a container configured to receive the uncombusted hydrocarbon liquids diverted by the diverter.

An aspect combinable with any of the other aspects can include the following features. The diverter includes a back portion that is arcuate in shape.

An aspect combinable with any of the other aspects can include the following features. The diverter includes diverter side walls that are substantially planar and substantially vertical.

An aspect combinable with any of the other aspects can include the following features. The container includes container side walls that are substantially planar and substantially vertical. The container side walls are coplanar with the diverter side walls.

An aspect combinable with any of the other aspects can include the following features. The diverter is positioned above the container.

An aspect combinable with any of the other aspects can include the following features. The container is partially covered by a container top cover.

An aspect combinable with any of the other aspects can include the following features. An arcuate surface of a back portion of the diverter directs flow of diverted uncombusted fluids to the container.

Certain aspects of the subject matter described herein can be implemented as a method for optimizing a flare from a flare boom. The method includes capturing data regarding viscosity and flow rate of produced fluids entering a flare that includes produced fluids, compressed air, and diesel fuel. The method also includes determining if the flare is optimized, and continuously adjusting flow parameters including a flow rate of the diesel fuel rate and a flow rate of the compressed air.

An aspect combinable with any of the other aspects can include the following features. Capturing the data includes storing the data in a computer system that includes one or more processors and a computer-readable medium storing instructions executed by the one or more processors to perform operations.

An aspect combinable with any of the other aspects can include the following features. The method includes storing data in the computer system including the gas-oil ratio of the produced fluids.

An aspect combinable with any of the other aspects can include the following features. The method includes storing data in the computer system including the water saturation of the produced fluids.

An aspect combinable with any of the other aspects can include the following features. The method includes optimizing a flare from a first well in a field, and also including optimizing a flare from a second well in the field based on data stored from the first well.

The details of one or more implementations of the subject matter of this disclosure are set forth in the accompanying drawings and the description. Other features, aspects, and advantages of the subject matter will become apparent from the description, the drawings, and the claims.

DESCRIPTION OF DRAWINGS

FIGS. 3A and 3B are schematic diagrams of the catcher system under different flare conditions.

DETAILED DESCRIPTION

This disclosure describes spill protection as it relates to gas flaring, and in particular, to gas flaring associated with oil and gas drilling and production.

In some cases, not all of the fluid flowed to a flare boom connected to a drilling or production rig gets flared. The flaring can sometimes not be completely efficient, and some of the fluid flowed to the flare boom may remain unflared even while the flare remains burning. Under some circumstances, the flare may become extinguished completely, a situation sometimes referred to as a flame-out. An inefficient burn or a complete flame-out may occur due to poor maintenance of flare booms or other non-optimum conditions.

Unflared fluid can fall from the flare boom in a liquid state. If not handled, the unflared liquid may fall into the ground or, in the case of an offshore rig, the body of water in which the offshore rig is positioned. Typically, the amount of liquid due to inefficient combustion depends on the water/oil ratio of the fluid produced from the well. The volume of liquid in the event of a flame-out may be greater than the amount of routine liquid fall-out occurring due to inefficient combustion. In the event of a flame-out the amount of liquid can be the flow rate (in gallons per minute) multiplied by the duration of the flame-out in minutes until the stream is re-ignited or the valve closed. Depending on crew response time, an amount of liquid from a flame-out in a typical situation in one embodiment may be from one to ten gallons.

An advantage of implementing the subject matter described in this disclosure is that it provides for a system for efficiently and adequately capturing unflared liquid that may otherwise fall to the earth or ocean. Another advantage is that it provides efficient and reliable flow optimization by using sensor readings and historical data.

Figure 1A:
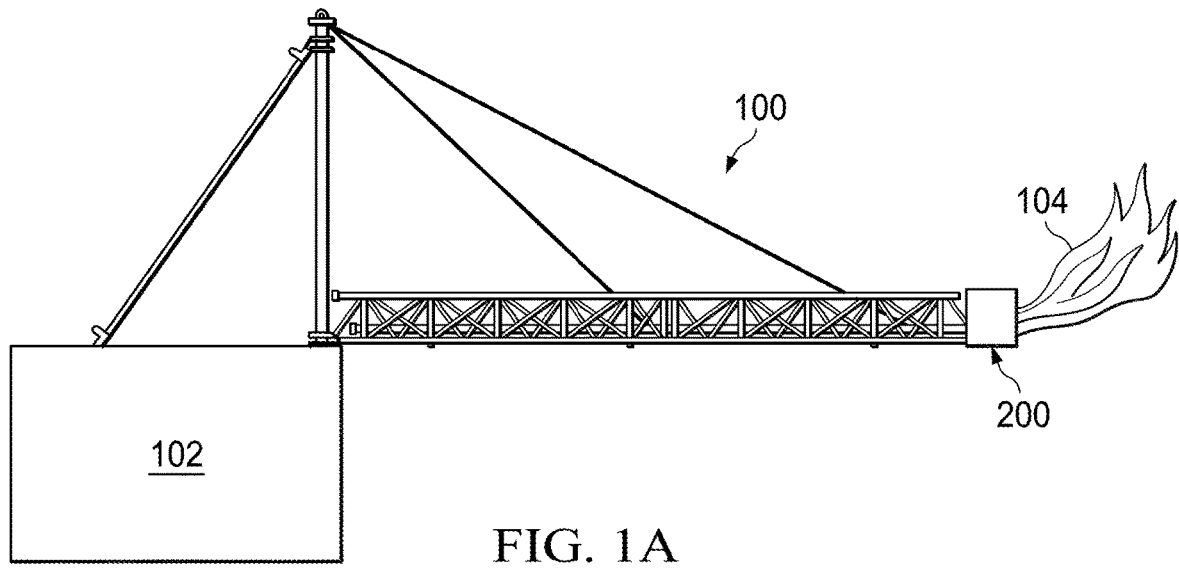
FIGS. 1A and 1B are schematic diagrams of a flare boom system in accordance with an embodiment of the present disclosure, in normal operations and in the event of a flame-out.

FIG. 1A is a schematic diagram of a flare boom 100 during normal operations, in accordance with an embodiment of the present disclosure. The flare boom 100 of this example is configured to connect to an offshore drilling rig 102. The rig can be any drilling or production rig intended for any one or more of the following purposes: exploring a rock formation located beneath the ground or seabed for hydrocarbons, producing the hydrocarbons from the rock formation, storing the produced hydrocarbons, and processing the produced hydrocarbons.

The flare boom 100 is configured to flare at least a portion of fluids (such as hydrocarbons) flowed from the offshore drilling rig 102. For example, in the case where crude oil is extracted and produced from an oil well, natural gas may also be produced. Where pipelines or other gas transportation infrastructure is not readily available to transport such natural gas, the natural gas is typically flared. Ideally, all of the fluids flowed to the flare boom 100 are flared, that is, burned off by combustion flame 104. A pilot flame (not shown) at the end of the flare boom 100 provides ignition to the escaping gas.

Although most of the fluids flowed from the flare boom are combusted, inefficient combustion and other factors may result in some amount of liquids being uncombusted, even during normal operations.

Figure 1B:
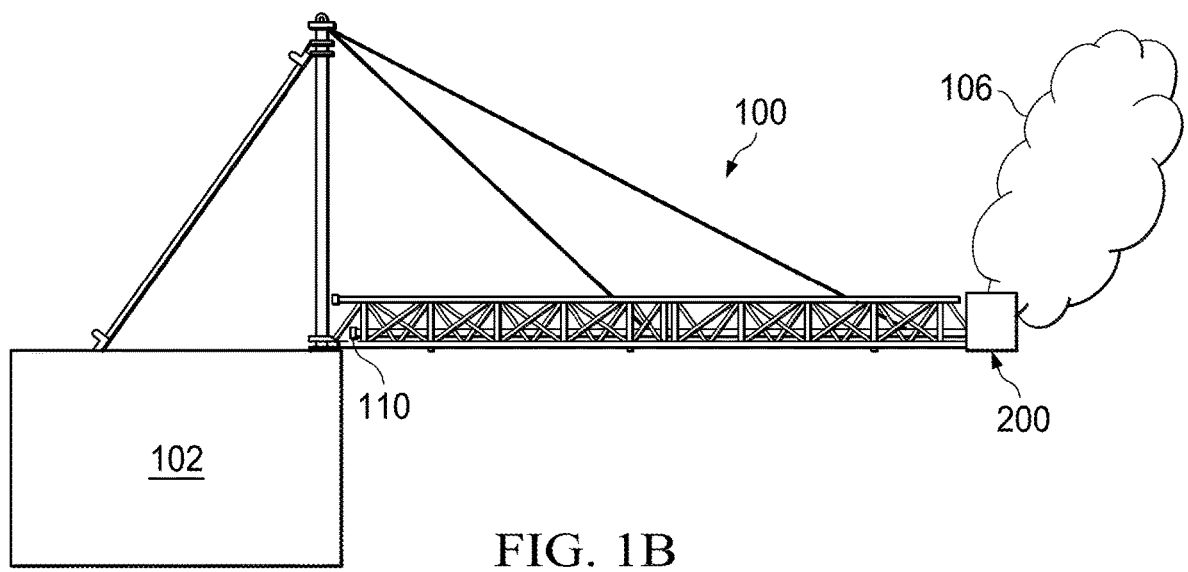

A flame-out situation is shown in FIG. 1B. When combustion ceases during a flame-out, uncombusted gas 106 may be released into the atmosphere. Such uncombusted release may continue until fluid release is stopped via closure of a shut-down valve 110 or the escaping fluid is re-ignited. The volume of uncombusted liquid in a flame-out situation may be larger than the typical liquid fallout volume resulting during normal operations from inefficient combustion.

A catcher device 200 is shown in FIGS. 1A and 1B installed at the end of boom 100 and is operable to divert and contain at least a portion of the uncombusted liquids resulting from inefficient combustion or from a flame-out and thus prevent these liquids from falling to the ground or ocean. Catcher device 200 is described in detail with reference to FIGS. 2A and 2B. Although FIGS. 1A and 1B describe a flare in relation to an offshore rig, the systems described in this disclosure can also be implemented on an onshore rig or in other facilities that include a flare.

Figure 2A:
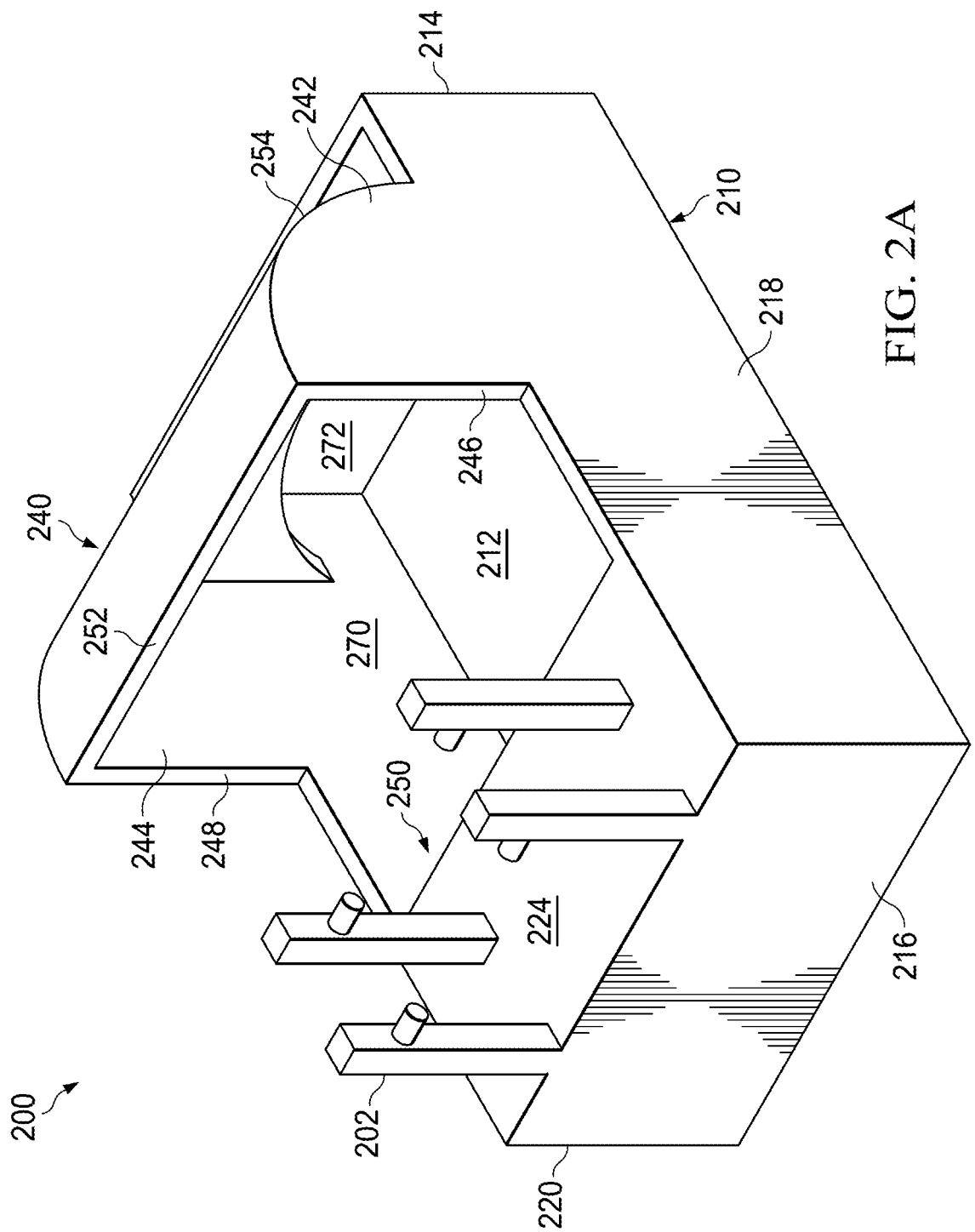
FIGS. 2A and 2B are schematic diagrams of a catcher system in accordance with an embodiment of the present invention.
Figure 2B:
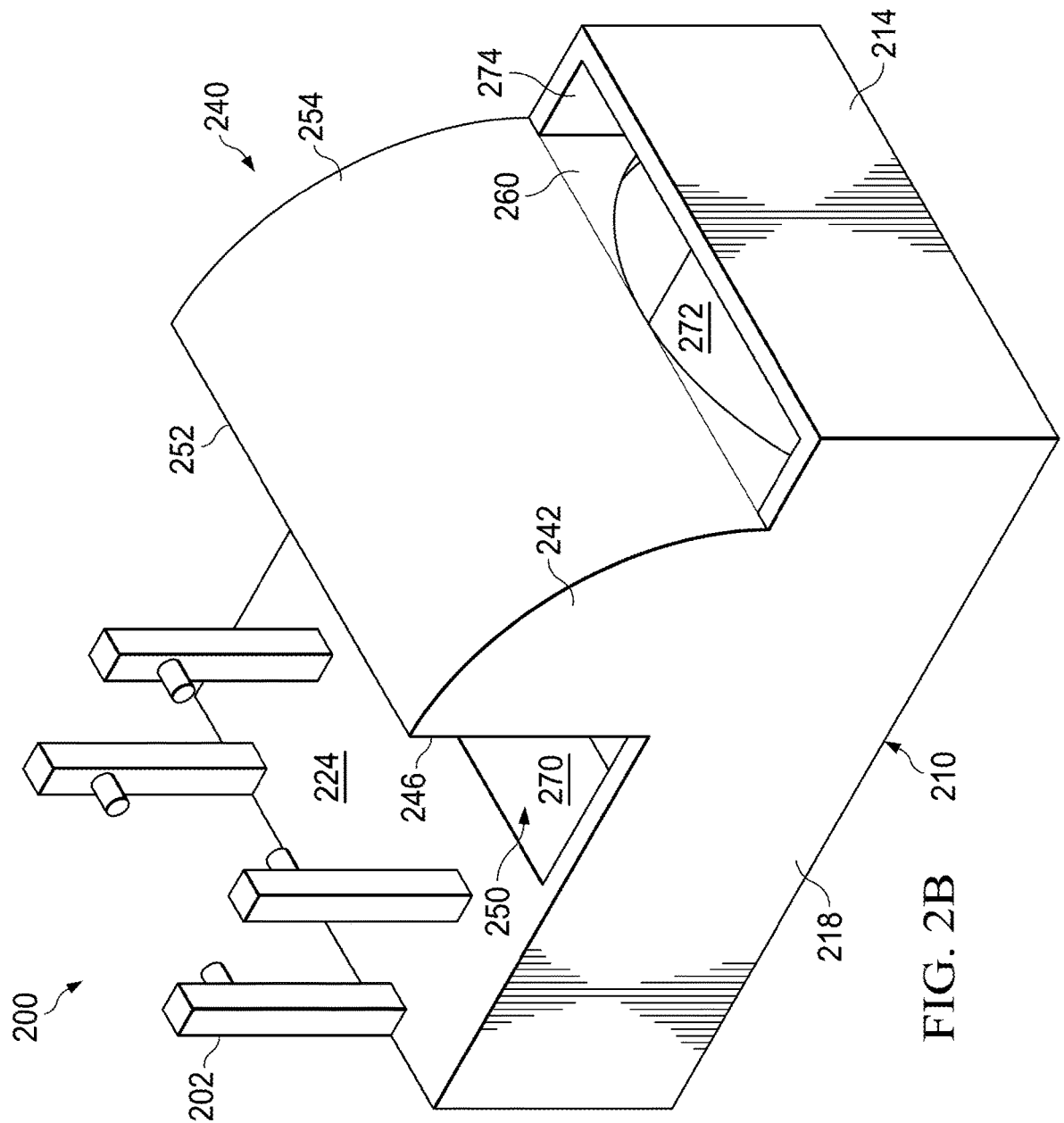
Figure 2C:
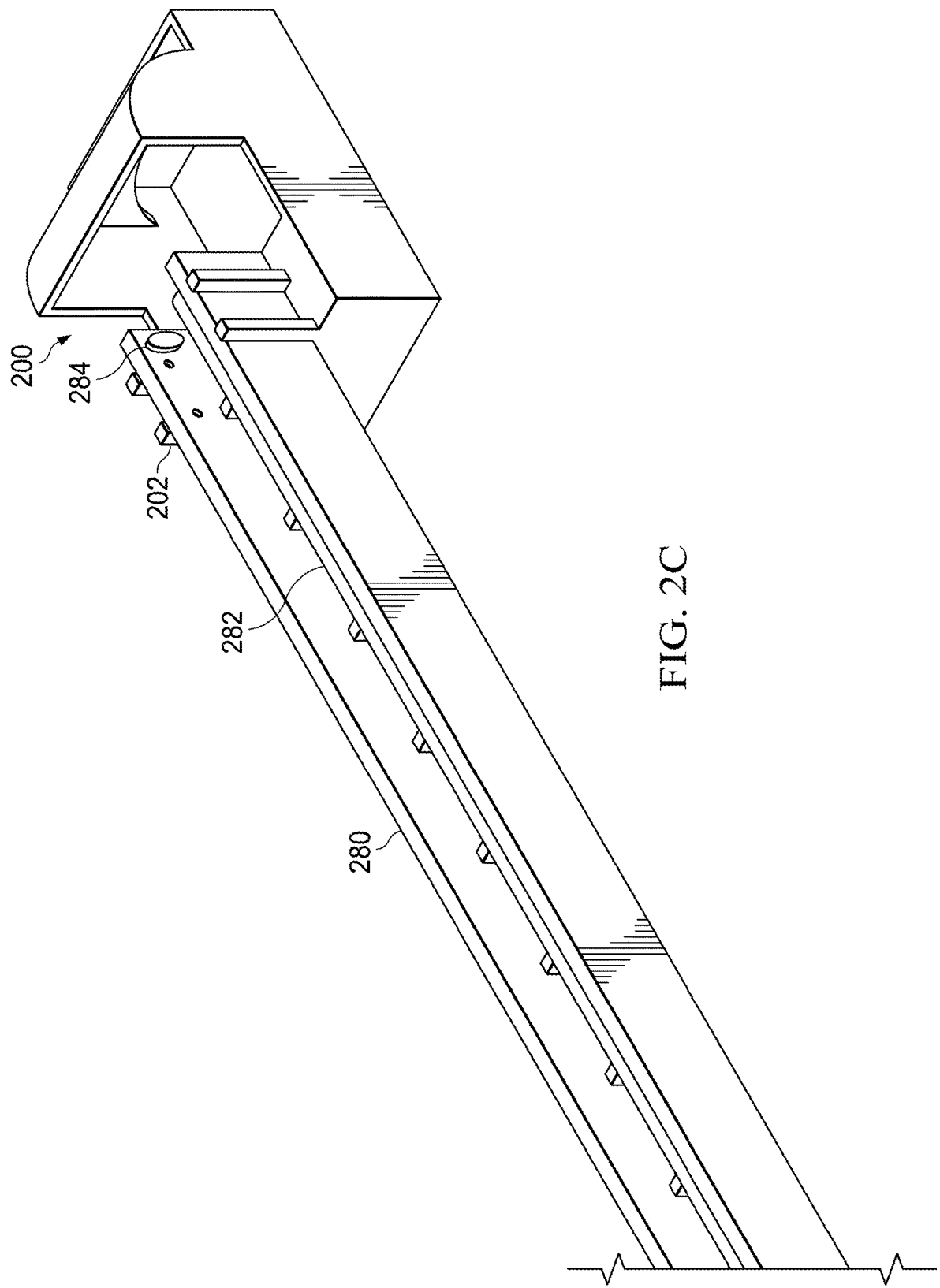
FIG. 2C is a schematic diagram of the catcher system as attached to a flare boom in accordance with an embodiment of the present disclosure.

FIGS. 2A-2C are schematic diagrams of a flare spill control system in accordance with an embodiment of the present disclosure. FIGS. 2A and 2B are schematic diagram of a catcher device 200 viewed from two different perspectives. FIG. 2C is a schematic diagram showing the catcher device 200 attached to the end of a flare boom.

Referring to FIGS. 2A and 2B, catcher device 200 can be made of heat-resistant ceramic or another suitable material that can withstand the heat from a flare, and includes a container 210. In the illustrated embodiment, container 210 is substantially box-shaped (for example, cuboid shaped), with its bottom defined by bottom element 212 that is planar and substantially rectangular in shape. With a frame of reference facing out from the tip of the flare boom, the sides of container 210 comprise container back (furthest away) side 214, container front (closest) side 216, container right side 218, and container left side 220, the planes of which are perpendicular to the plane of bottom element 212. The bottom edges of container back side 214, front side 216, right side 218, and left side 220 are sealingly connected with the edges of bottom element 212, such that container 210 can hold a volume of liquid without substantial leakage. In other embodiments, container 210 can be a shape other than cuboid (such as spherical, spheroid, or cylindrical). Container 210 is partially covered by container top cover 224.

As described in further detail in reference to FIG. 2C, container 210 is sized such that its interior volume is of sufficient size to hold an expected volume of liquids escaping from a flare boom from inefficient combustion, or in the event of a flame-out.

Catcher device 200 further comprises diverter 240. Diverter 240 comprises an opening 270 bounded by top diverter edge 252, right vertical diverter edge 246, left vertical diverter edge 248, and container top edge 250. As described in further detail in relation to FIG. 2B, opening 270 is large enough to permit entry of the main flow of a gas or combustion flame plume from a flare and at least a portion of associated spray or droplets of uncombusted liquids that may surround the main flow. In the illustrated embodiment, diverter side walls 242 and 244 are planar and vertical, with the plane of the side walls parallel to the main direction of the flare from the flare boom. Left diverter side wall 242 and right diverter side wall 244 in the illustrated embodiment are coplanar with container left side 220 and container right side 218, respectively.

In the illustrated embodiment, diverter back 254 has a curved or arcuate shape. The curved interior of diverter back 254 is configured such that, if uncombusted liquids (such as from a flare boom flow line—see FIG. 2C) strike the interior of diverter back 254, that portion will not escape to the outside environment and instead will flow along the interior curve due to gravity into container 210. Diverter side walls 242 and 244 likewise divert uncombusted liquids that would otherwise escape in a lateral direction (left or right), such that such diverted liquids that strike side walls 242 and 244 flow along the interior surface of side walls 242 and/or 244 due to gravity into container 210. In the illustrated embodiment, diverter 240 is positioned above container 210; however, in other embodiments, container 210 can be positioned elsewhere in relation to diverter 240 and diverted fluids can flow to container 210 via flowlines or other liquid conveyances. Container top cover 224 and container sides 214, 216, 218 and 220 prevent diverted liquid from splashing or leaking out of container 210.

Shoulder 260 spans between the interior surfaces of left diverter side wall 242, right diverters side wall 244, and diverter back 254. Shoulder 260 buttresses side walls 240 and 244 and diverter back 254 and provides additional strength to diverter 240. In the illustrated embodiment, the bottom edge of shoulder 260 comprises an arc shape, the top of which forms the top of vent passage 272. Vent exit 274 comprises an opening through which fluid flow can exit the back of catcher 200.

Connectors 202 are shaped to latch catcher device securely to the end of a flare boom (see FIG. 2C). In some embodiments of the disclosure, connectors 202 can comprise quick-release connectors. In other embodiments, connectors can be part of a rail track system for the mechanical lowering of catcher 200 to the rig to allow for emptying of contents and/or other maintenance. In some embodiments, catcher 200 can further comprise flow lines and/or valves (not shown) that allow for the emptying of the liquid contents of container 210 either continuously or as a part of periodic maintenance.

FIG. 2C shows catcher device 200 attached to the end of flare boom 280 with connectors 202. Flare boom 280 has corresponding latch elements (not shown) to latch securely to the corresponding latch components of connectors 202. For example, connectors 202 can comprise male latch elements and the corresponding latch elements along flare boom 280 can comprise corresponding female latch elements.

Flareline 282 carries gas and other fluids along the length of the boom 280. The positioning of catcher device 200 is such that it will divert the flow of unflared liquids that exit the end of the flareline 282 to the container 210. See also FIGS. 3A and 3B. Such placement can assume a typical trajectory of such liquids due to inefficient operation or during a flame-out situation.

Referring to the catcher device 200 of FIGS. 2A and 2B in relation to FIG. 2C, and as described in more detail with respect to FIGS. 3A and 3B, the main flow of gas or combusted flame can exit flareline 282 and, in a low-flow rate scenario, rise above the top diverter edge 252. Uncombusted liquids can in such a low-flow rate scenario fall down into container 210. In contrast, in a high-flow rate scenario, as fluid flow exits the flareline 282, it can travel through catcher device 200 and flow beneath the top diverter edge 252. The flow can be diverted by diverter back 254, travel through vent passage 272, and exit from the catcher from vent exit 274. Uncombusted liquids that would otherwise spray upwards and escape strike the back of diverter back 254 and, due to the curved or arcuate shape of diverter back 254, flow due to gravity into container 210. Uncombusted liquids that would otherwise spray and escape laterally (right or left) strike the interior sides of diverter side walls 242 and 244 and likewise flow due to gravity into container 210. In an embodiment of the present disclosure, the catcher device 200 is installed far away enough from the end of flare boom 280 such that catcher device 200 and diverter back 254 will not create a back pressure effect or a high-erosion effect even in such a high-flow rate scenario.

Flame-out sensor 284 can comprise a thermocouple, infrared sensor, or other device operable to sense whether the flame is present or has been extinguished. In some embodiments, the sensor can determine a temperature or other characteristics of the flame and/or fluid flow. The sensor can be in communication via a wired or wireless connection with a programmable logic computer (not shown), that in turn can be operable to recognize a flameout event or other characteristics of the flare and, in response, send appropriate instructions to control systems. The computer can include one or more processors and a computer-readable medium (for example, non-transitory computer-readable medium) storing instructions executable by the one or more processors to perform operations. Such instructions can include shutting off flow in the event of a flameout. The computer can be physically placed in the rig or can be at some other location. In some embodiments, the computer can be in communication with the sensor via a wireless cloud network.

Container 210 has an interior volume of sufficient size to hold an expected volume of liquids escaping from a flare boom in the event of a flame-out, during an expected interval of time between the sensing of a flame-out by sensor 284 and either a shut-off of flow (by shut-down valve 110 or by other means) or a re-ignition of the flare. In an embodiment of the present invention, the volume can also be slightly larger than the expected volume so as to reduce or eliminate splashing out of the container 210. In an embodiment of the present disclosure, container 210 can have a volume of about 5 barrels. In another embodiment of the present invention, container 210 can have a volume of about 10 barrels.

FIGS. 3A and 3B are schematic diagrams of a catcher system 200 of FIGS. 2A-2C under different flare conditions.

A low-flow rate scenario is illustrated in FIG. 3A. In such a low-flow rate scenario, the main flow of gas exits flare boom 280 and flame 310 rises above diverter 240 and over the top of catcher device 200. Uncombusted liquids 311 can in such a low-flow rate scenario fall down into the container 210 of catcher device 304.

In contrast, in a high-flow rate scenario illustrated in FIG. 3B, as fluid flow 320 exits the flare boom 280, it can travel through catcher device 304 and be diverted by diverter back 254, travel through vent passage 272 beneath shoulder 260, and exit from the catcher from vent exit 274. Uncombusted liquids 311 that would otherwise spray upwards and escape strike the back of diverter back 254 and, due to the curved or arcuate shape of diverter back 254, flow due to gravity into container 210. Uncombusted liquids 311 that would otherwise spray and escape laterally (right or left) strike the interior sides of diverter 240 and likewise flow due to gravity into container 210.

Figure 4:
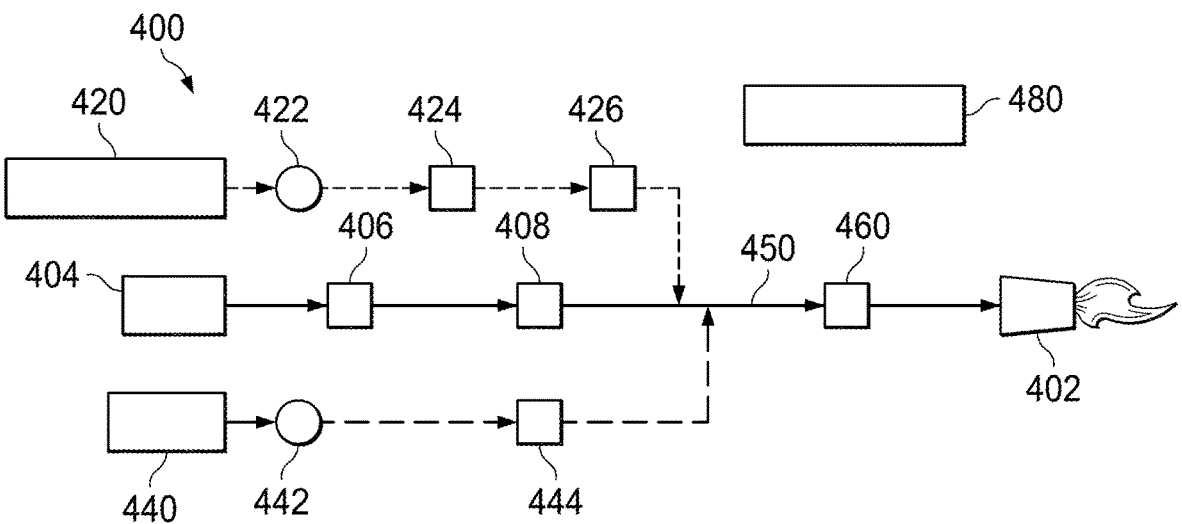
FIG. 4 is a schematic diagram of a flow optimization system in accordance with an embodiment of the present disclosure.

FIG. 4 is a schematic diagram of a flow optimization system in accordance with an embodiment of the present disclosure. Optimization system 400 can be installed on offshore rig 102 or another suitable hydrocarbon exploration or production rig. Optimization system 400 comprises burner head 402 which can be placed at the end of a flare boom such as flare boom 100 of FIGS. 1A-1B and/or flare boom 208 of FIG. 2C, and which is configured to flare at least a portion of fluids (such as hydrocarbons) flowing from a well 404. A viscometer 406 measures the viscosity of the fluids from well 404. A flowmeter 408 measures the flow rate of fluids from well 404.

Optimization system 400 further comprises air compressor 420 configured to add additional air flow to the stream of fluids from well 404. A regulator 422 regulates the flow of air from compressor 420 and a flowmeter 424 measures the flow rate of air from compressor 420. A pressure gauge 426 measures the pressure of the air from compressor 420.

Optimization system 400 further comprises a diesel line 440 configured to flow diesel fuel from a diesel source such as a tank placed on offshore rig 102. A regulator 442 regulates the flow of diesel. A flowmeter 444 measures the flow rate of diesel from diesel line 440.

Combined stream 450 includes hydrocarbons from well 404, air from compressor 420, and diesel fuel from diesel line 440. A viscometer 460 measures the viscosity of combined stream 450. Combined stream 450 is combusted in burner head 402.

In some implementations, optimization system 400 can include a computer system 480. The computer system 480 can receive data via a wireless or wired connection from viscometers 406 and 460, flowmeters 408, 424, and 444, and pressure gauge 426. Optimization system 400 can also receive further data regarding the hydrocarbon field and target reservoir from which the offshore rig with optimization system 400 is producing, including for example the gas-oil ratio, water saturation, and production rate. Computer system 480 can include one or more processors and a computer-readable medium (for example, non-transitory computer-readable medium) storing instructions executable by the one or more processors to perform operations. The operations can include, for example, storing the above-listed received data and transmitting instructions to regulators 422 and 442 to control the flow rate of compressed air and diesel, respectively. As described in more detail with respect to FIG. 5, data stored in computer system 480 can be used to optimize the flare from burner head 402.

Figure 5:
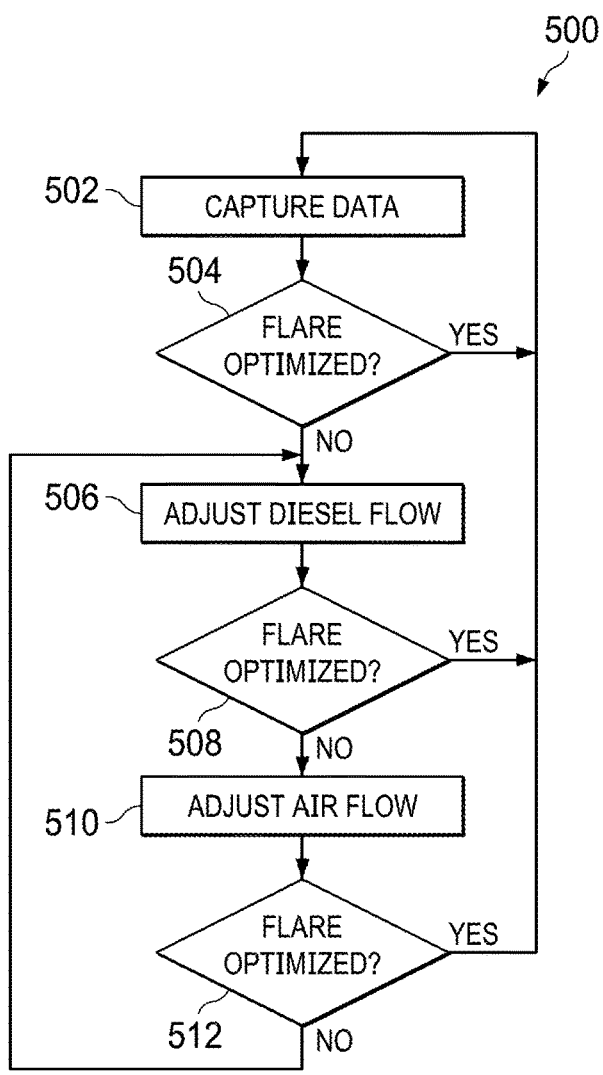
FIG. 5 is a process flow diagram of a method for flow optimization in accordance with an embodiment of the present disclosure.

FIG. 5 is a process flow diagram of a method 500 for flow optimization in accordance with an embodiment of the present disclosure. Method 500 is described in reference to optimization system 400 of FIG. 4; however, method 500 can be implemented on other hydrocarbon flare systems.

The method begins at step 502 where the well is flared and data for key parameters including flow rate and viscosity of hydrocarbons from the well 404, flow rate and pressure of air from air compressor 420, flow rate from diesel line 440, and viscosity of the combined stream 450 are captured by computer system 480. Further data regarding the hydrocarbon field and target reservoir from which the offshore rig with optimization system 400 is producing, including for example the gas-oil ratio, water saturation, and production rate, can also be captured.

The method proceeds to step 504, wherein a determination is made whether the flare is optimized under the parameters captured in step 502. Such determination can be made by visual observation of the flare produced from burner head 402. An optimized flare can be characterized by visual observation of smokeless combustion (zero or low smoke produced from the combustion). A large amount of smoke produced by the flare can indicate that the flare is not optimized. In other embodiments, flare optimization can be accomplished through automated analysis of the products of combustion, temperature readings, or other parameters. If the determination is made at step 504 that the flare is optimized, then the flaring continues and the optimization system 400 returns to step 502 to continue to capture data.

If the determination is made at step 504 that the flare is not optimized, then the method continues to step 506 wherein the diesel flow rate is adjusted via regulator 442. At step 508, a determination is made whether the flare is optimized by the adjusted diesel flow rate. If the determination is made at step 508 that the flare is optimized with the adjusted diesel flow rate, then the flaring continues and the optimization system 400 returns to step 502 to continue to flare and capture data.

If the determination is made at step 508 that the flare is not optimized by adjustment of the diesel flow, then the method continues to step 510 wherein the compressed air flow rate is adjusted via regulator 422. At step 512, a determination is made whether the flare is optimized by the adjusted compressed air flow rate. If the determination is made at step 512 that the flare is optimized with the adjusted compressed air flow rate, then the flaring continues and the optimization system 400 returns to step 502 to continue to capture data.

If the determination is made at step 508 that the flare is not optimized by adjustment of the compressed air flow, then the method returns to step 506 wherein the diesel flow rate can again be adjusted via regulator 442.

In some embodiments, computer system 480 can continuously capture data from the different sensors and record and flag any changes to other parameters such as well flow rate, viscosity, or hydrocarbon composition. Data regarding parameters at which flaring is optimized or not optimized for a particular reservoir or field can be stored by the computer system 480 and utilized in designing flare systems and flow rates and other settings for future wells from the same or similar reservoir or field. Other field and/or reservoir characteristics such as the type of hydrocarbons produced, gas/oil ratio, and water/oil ratio can also be stored in computer system 480. In this way, optimization system 400 can be utilized to plan for and optimize flares in multiple wells from the same reservoir or field. A combined flare system including optimization system 400 along with a catcher device such as catcher device 200 of FIGS. 2A-2C can increase efficiency and minimize environmental impact from flaring operations.

In this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In this disclosure, "approximately" or "substantially" means a deviation or allowance of up to 10 percent (%) and any variation from a mentioned value is within the tolerance limits of any machinery used to manufacture the part. Likewise, "about" can also allow for a degree of variability in a value or range, for example, within 10%, within 5%, or within 1% of a stated value or of a stated limit of a range.

While this disclosure contains many specific implementation details, these should not be construed as limitations on the subject matter or on what may be claimed, but rather as descriptions of features that may be specific to particular implementations. Certain features that are described in this disclosure in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Nevertheless, it will be understood that various modifications, substitutions, and alterations may be made. While operations are depicted in the drawings or claims in a particular order, this should not be understood as requiring that such operations be performed in the particular order shown or in sequential order, or that all illustrated operations be performed (some operations may be considered optional), to achieve desirable results. Accordingly, the previously described example implementations do not define or constrain this disclosure.

What is claimed is:

1. A hydrocarbon management system comprising:
a flare boom configured to connect to a drilling or production rig, the flare boom configured to combust at least a portion of hydrocarbon fluids flowed from the rig to the flare boom; and
a catcher attached to the end of the flare boom and configured such that a combustion plume of a flare from the flare boom can enter an opening of the catcher, the catcher comprising:
a diverter, a top edge of which partially defines the opening, the diverter positioned to divert a flow of uncombusted hydrocarbon liquids from the flare boom, wherein the diverter comprises a back portion that is arcuate in shape and is configured such that at least a portion of the uncombusted hydrocarbon liquids spraying upward from the flare boom strike the back portion and are thereby diverted, and wherein a bottom edge of the diverter partially defines a vent passage beneath the diverter, and wherein the catcher is configured such that, during low flow-rate scenarios, gas flowing from the flare boom rises above the top edge of the diverter over the top of the catcher and, during high flow-rate scenarios, gas flowing from the flare boom is at least partially diverted by the back portion of the diverter and travels through the vent passage to exit the catcher out the back of the catcher; and
a container configured to receive the uncombusted hydrocarbon liquids diverted by the diverter.

2. The system of claim 1, further comprising a sensor operable to detect an extinguishment of the combustion.

3. The system of claim 1, wherein the container is sized to hold an expected volume of uncombusted hydrocarbon liquids flowing from the boom in a time period between an extinguishment of combustion and a response action initiated in response to a detection of the extinguishment by the sensor, the response action comprising at least one of:
a shutdown of the flow; and
a re-ignition of the combustion.

4. The hydrocarbon management system of claim 1, wherein the diverter comprises diverter side walls that are substantially planar and substantially vertical.

5. The hydrocarbon management system of claim 4, wherein the container comprises container side walls that are substantially planar and substantially vertical, and wherein the container side walls are coplanar with the diverter side walls.

6. The hydrocarbon management system of claim 1, wherein the diverter is positioned above the container.

7. The hydrocarbon management system of claim 1, wherein the container is partially covered by a container top cover.

8. The hydrocarbon management system of claim 2, further comprising a programmable logic computer in communication with the sensor.

9. A catcher configured to connect to a flare boom of a drilling or production rig, the flare boom configured to combust at least a portion of hydrocarbon fluids flowed from the flare boom to the rig, the catcher comprising:
a diverter positioned to divert a flow of uncombusted hydrocarbon liquids from the flare boom, a top edge of the diverter partially defining an opening, the catcher configured such that a combustion plume of a flare from the flare boom can enter the opening when the catcher is connected to the flare boom, the diverter comprising a back portion that is arcuate in shape and i-s configured such that the uncombusted hydrocarbon liquids spraying upward from the flare boom strike the back portion and are thereby diverted, and wherein a bottom edge of the diverter partially defines a vent passage beneath the diverter, and wherein the catcher is configured such that, during low flow-rate scenarios, gas flowing from the flare boom rises above a top edge of the diverter over the top of the catcher and, during high flow-rate scenarios, gas flowing from the flare boom is at least partially diverted by the back portion of the diverter and travels through the vent passage to exit the catcher out the back of the catcher;
and
a container configured to receive the uncombusted hydrocarbon liquids diverted by the diverter.

10. The catcher of claim 9, wherein the diverter comprises diverter side walls that are substantially planar and substantially vertical.

11. The catcher of claim 10, wherein the container comprises container side walls that are substantially planar and substantially vertical, and wherein the container side walls are coplanar with the diverter side walls.

12. The catcher of claim 9, wherein the diverter is positioned above the container.

13. The catcher of claim 9, wherein the container is partially covered by a container top cover.

14. The catcher of claim 1, wherein an arcuate surface of a back portion of the diverter directs flow of diverted uncombusted liquids to the container.

* * * * *

UNITED STATES PATENT AND TRADEMARK OFFICE
CERTIFICATE OF CORRECTION

| | |
|---|---|
| PATENT NO. | : 11,867,394 B2 |
| APPLICATION NO. | : 17/066169 |
| DATED | : January 9, 2024 |
| INVENTOR(S) | : Ahmad A. Amoudi et al. |

It is certified that error appears in the above-identified patent and that said Letters Patent is hereby corrected as shown below:

In the Claims

Column 10, Line 33, Claim 9, please replace "i-s-configured" with -- configured --.

Signed and Sealed this
Thirtieth Day of April, 2024

Katherine Kelly Vidal
*Director of the United States Patent and Trademark Office*